United States Patent
Nakasaka

(10) Patent No.: US 8,392,095 B2
(45) Date of Patent: Mar. 5, 2013

(54) SPARK IGNITION TYPE INTERNAL COMBUSTION ENGINE

(75) Inventor: Yukihiro Nakasaka, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 398 days.

(21) Appl. No.: 12/671,589

(22) PCT Filed: Nov. 6, 2008

(86) PCT No.: PCT/JP2008/070644
§ 371 (c)(1),
(2), (4) Date: Feb. 1, 2010

(87) PCT Pub. No.: WO2009/061005
PCT Pub. Date: May 14, 2009

(65) Prior Publication Data
US 2011/0041810 A1 Feb. 24, 2011

(30) Foreign Application Priority Data

Nov. 8, 2007 (JP) .................................. 2007-290851

(51) Int. Cl.
*F02D 43/00* (2006.01)
*F02B 75/04* (2006.01)
*F01L 1/34* (2006.01)
(52) U.S. Cl. .................... 701/103; 123/48 C; 123/90.15
(58) Field of Classification Search .......... 701/101–103, 701/113; 123/48 C, 48 R, 48 D, 78 R, 78 C, 123/90.15–90.18, 90.11, 316; 60/286
See application file for complete search history.

(56) References Cited

U.S. PATENT DOCUMENTS

| 4,174,683 | A * | 11/1979 | Vivian ......................... 123/48 C |
| 6,732,682 | B2 * | 5/2004 | Aoyama et al. ............. 123/48 B |
| 7,267,087 | B2 * | 9/2007 | Glugla ........................ 123/48 R |
| 7,802,543 | B2 * | 9/2010 | Akihisa et al. ............. 123/48 R |
| 7,882,821 | B2 * | 2/2011 | Akihisa et al. ............... 123/347 |
| 2004/0237917 | A1 * | 12/2004 | Yasui et al. ................ 123/90.15 |
| 2005/0081511 | A1 * | 4/2005 | Tomita et al. ................... 60/274 |
| 2005/0087155 | A1 * | 4/2005 | Kikori ........................ 123/78 C |
| 2007/0181088 | A1 * | 8/2007 | Akasaka ................... 123/179.4 |
| 2007/0204602 | A1 * | 9/2007 | Kogo ............................. 60/299 |
| 2009/0012700 | A1 * | 1/2009 | Akihisa et al. ............... 701/105 |
| 2009/0064966 | A1 * | 3/2009 | Nakasaka ............... 123/339.11 |
| 2009/0099759 | A1 * | 4/2009 | Sasaki .......................... 701/113 |

FOREIGN PATENT DOCUMENTS

| JP | A-59-63340 | 4/1984 |
| JP | B2-4-28893 | 4/1984 |

(Continued)

OTHER PUBLICATIONS

International Search Report for International Application No. PCT/JP2008/070644, issued Dec. 9, 2008.

*Primary Examiner* — John T. Kwon
*Assistant Examiner* — Johnny Hoang
(74) *Attorney, Agent, or Firm* — Oliff & Berridge, PLC

(57) ABSTRACT

In an internal combustion engine, a variable compression ratio mechanism able to change a mechanical compression ratio, a variable valve timing mechanism able to control the closing timing of the intake valve, and an electronic control unit that predicts the temperature of the catalyst arranged in the engine exhaust passage are provided. When it is predicted that the temperature of the catalyst will fall to less than the activation temperature, the actual expansion ratio is lowered while maintaining the actual compression ratio the same or while increasing the actual compression ratio.

3 Claims, 15 Drawing Sheets

FOREIGN PATENT DOCUMENTS

| | | |
|---|---|---|
| JP | A-2-163429 | 6/1990 |
| JP | A-2001-248488 | 9/2001 |
| JP | A-2003-201890 | 7/2003 |
| JP | A-2004-218522 | 8/2004 |
| JP | A-2007-71046 | 3/2007 |
| JP | A-2007-239555 | 9/2007 |
| JP | A-2007-303423 | 11/2007 |

\* cited by examiner

Fig.1
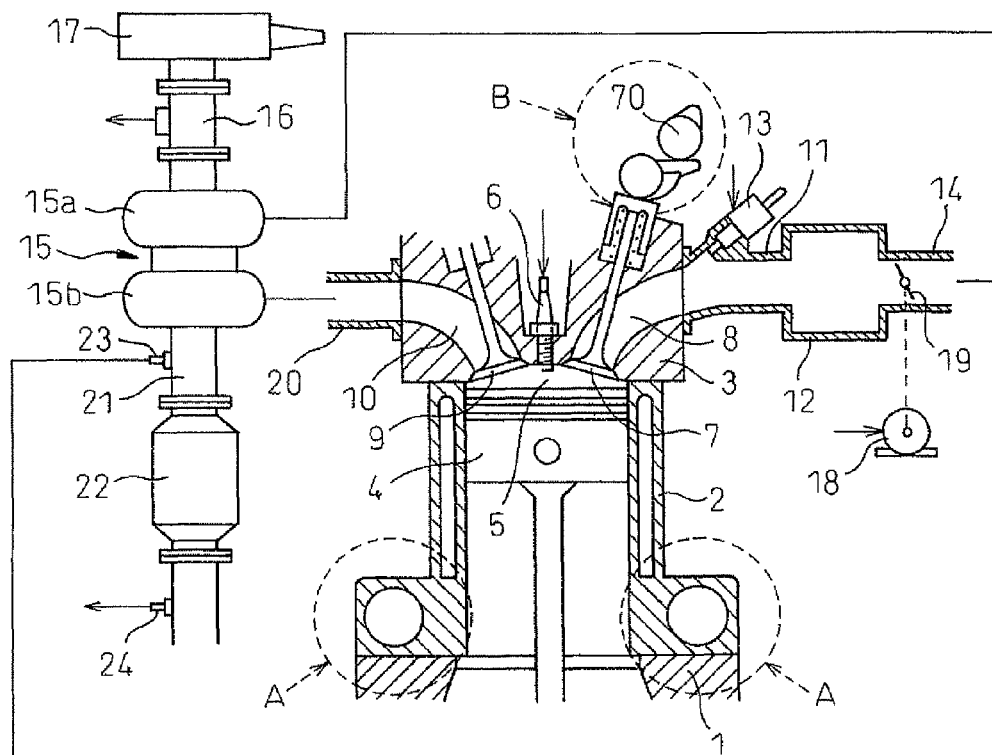
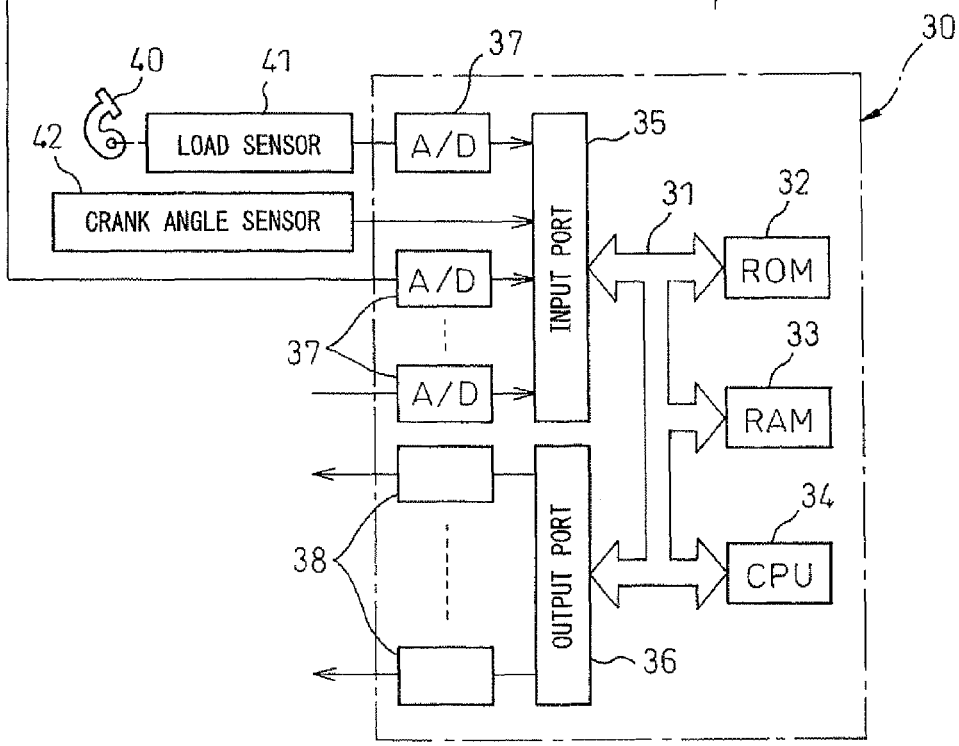

(A)　　　　　　　　　　　(B)

Fig.5
(A)
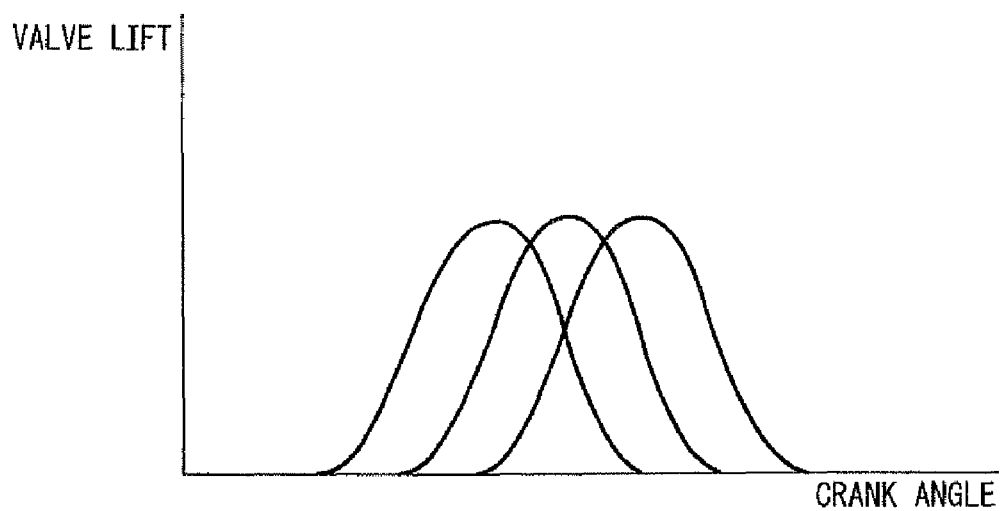
(B)
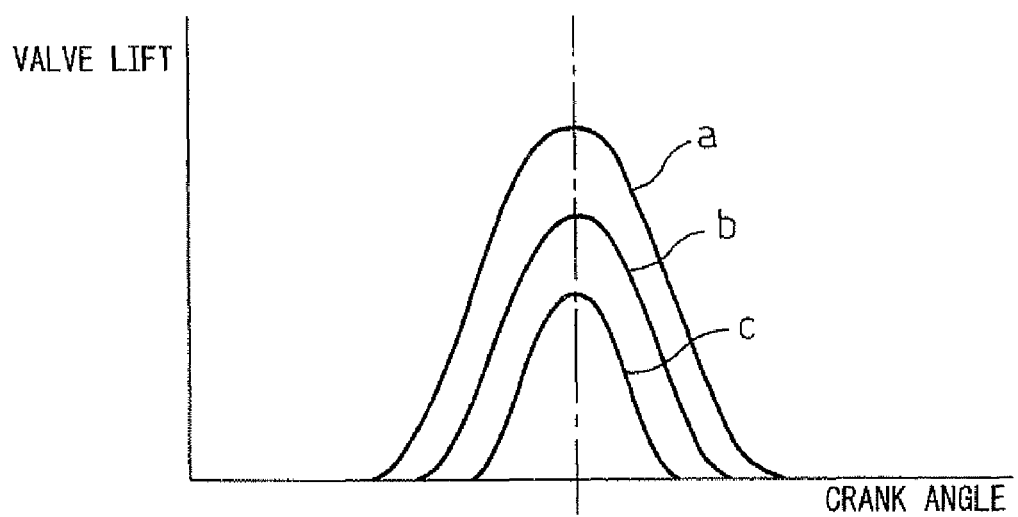

Fig. 6
(A)
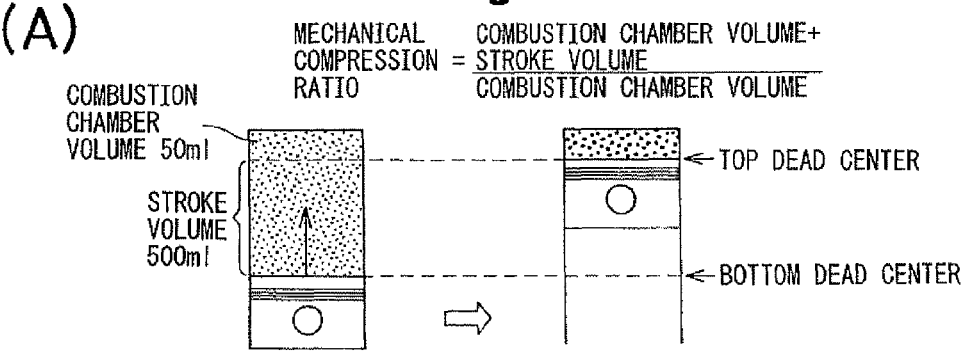
(B)
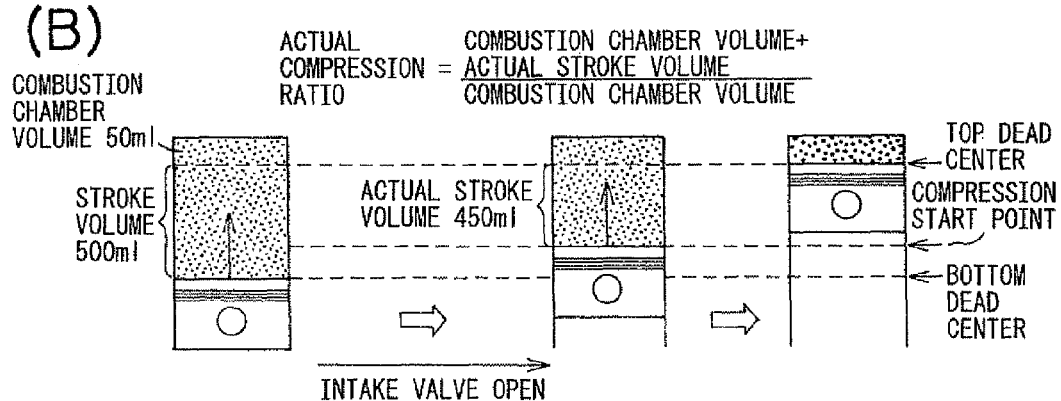
(C)
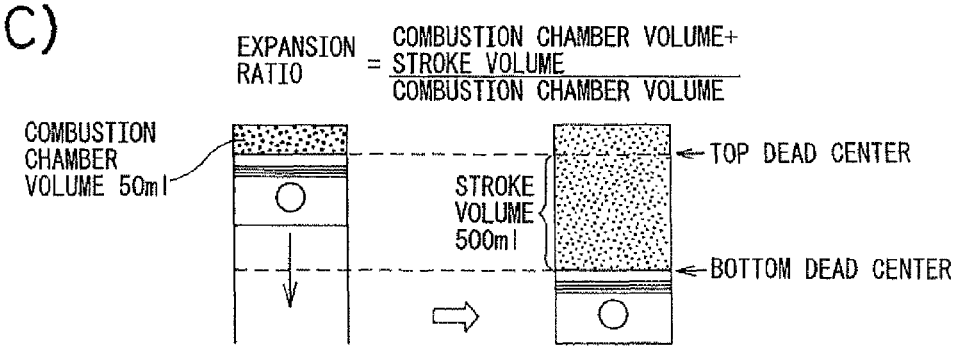
(D)
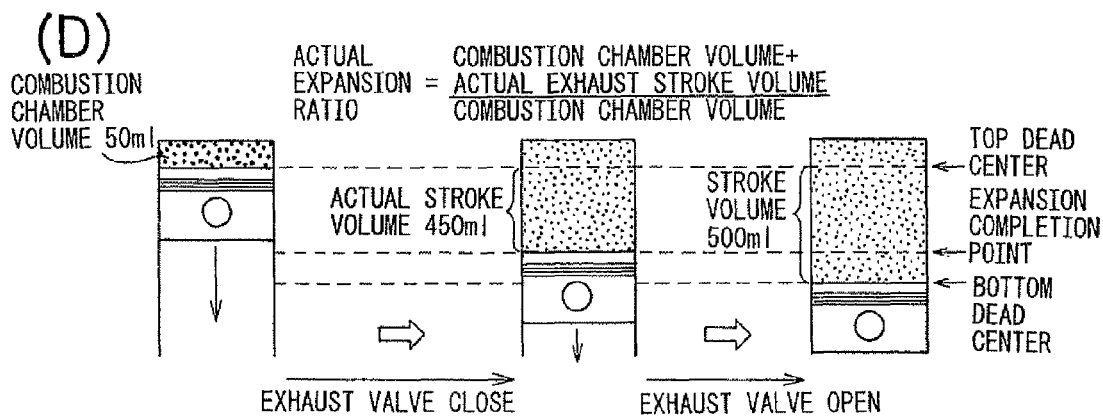

Fig.13
(A)
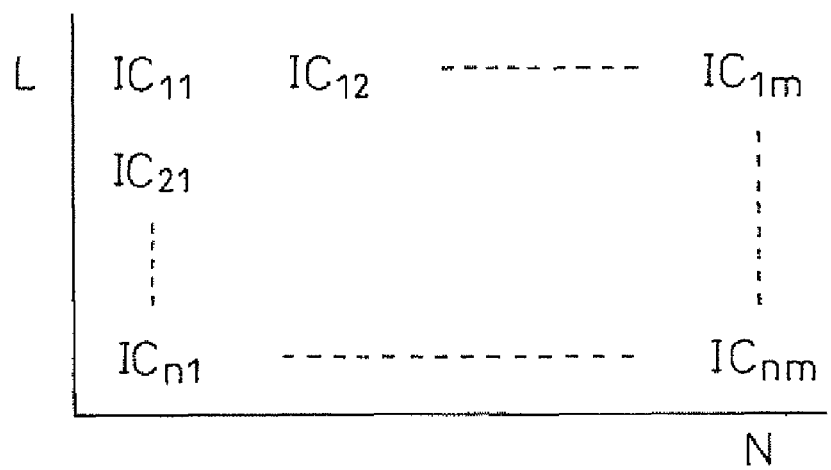
(B)
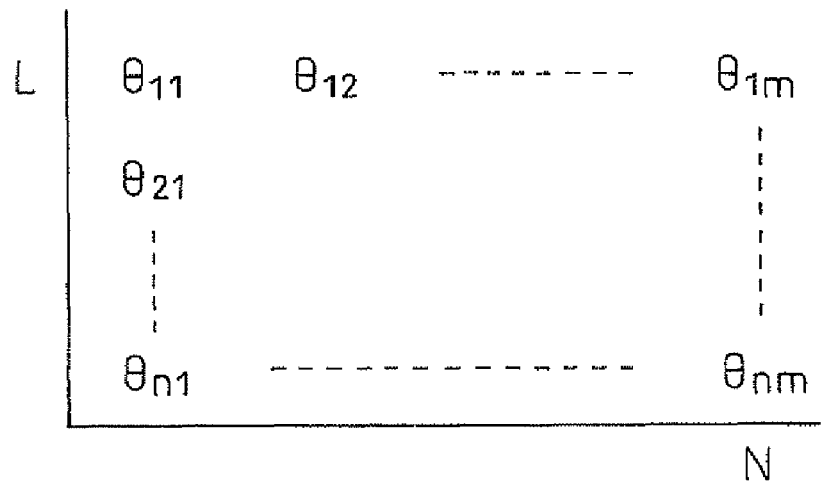

SPARK IGNITION TYPE INTERNAL COMBUSTION ENGINE

TECHNICAL FIELD

The present invention relates to a spark ignition type internal combustion engine.

BACKGROUND ART

Known in the art is a spark ignition type internal combustion engine provided with a system able to change a combustion chamber volume wherein when a temperature of a catalyst arranged inside an engine exhaust passage falls and activity will be lost, the combustion chamber volume is increased to lower the actual compression ratio and thereby cause the combustion efficiency to deteriorate and the exhaust gas temperature to rise and thus raise the temperature of the catalyst (for example, see Japanese Patent Publication (B) No. 4-28893).

However, if lowering the actual compression ratio to raise the temperature of the catalyst, there is the problem that the ignition and combustion of the fuel deteriorate, so stable combustion can no longer be obtained.

DISCLOSURE OF THE INVENTION

An object of the present invention is to provide a spark ignition type internal combustion engine able to raise the temperature of the catalyst while securing good ignition and combustion of the fuel.

According to the present invention, there is provided a spark ignition type internal combustion engine provided with a variable compression ratio mechanism able to change a mechanical compression ratio, a variable valve timing mechanism able to control a closing timing of an intake valve, a throttle valve arranged in an engine intake passage, and a catalyst arranged in an engine exhaust passage, the mechanical compression ratio being increased till a maximum mechanical compression ratio as an engine load becomes lower and the closing timing of the intake valve being shifted in a direction away from an intake bottom dead center as the engine load becomes lower when the catalyst is activated, wherein predicting means for predicting a temperature of the catalyst arranged in the engine exhaust passage is provided, and when it is predicted that the temperature of the catalyst will fall to less than an activation temperature, a decrease in the mechanical compression ratio is made larger, an amount of shifting of the closing timing of the intake valve toward the intake bottom dead center is made larger and a decrease in the opening degree of the throttle valve is made larger as the engine load becomes lower to lower an actual expansion ratio while maintaining the actual compression ratio the same or while increasing the actual compression ratio.

BRIEF DESCRIPTION OF THE DRAWINGS

FIG. 1 is an overview of a spark ignition type internal combustion engine.

FIG. 5 is a view showing the amounts of lift of the intake valve and exhaust valve.

FIG. 6 is a view for explaining the engine compression ratio, actual compression ratio, expansion ratio and actual expansion ratio.

FIG. 13 is a view showing a map of the closing timing IC of the intake valve etc., FIG. 14 is a view showing a map of the closing timing IC' of the intake valve etc.

BEST MODE FOR CARRYING OUT THE INVENTION

Figure 2:
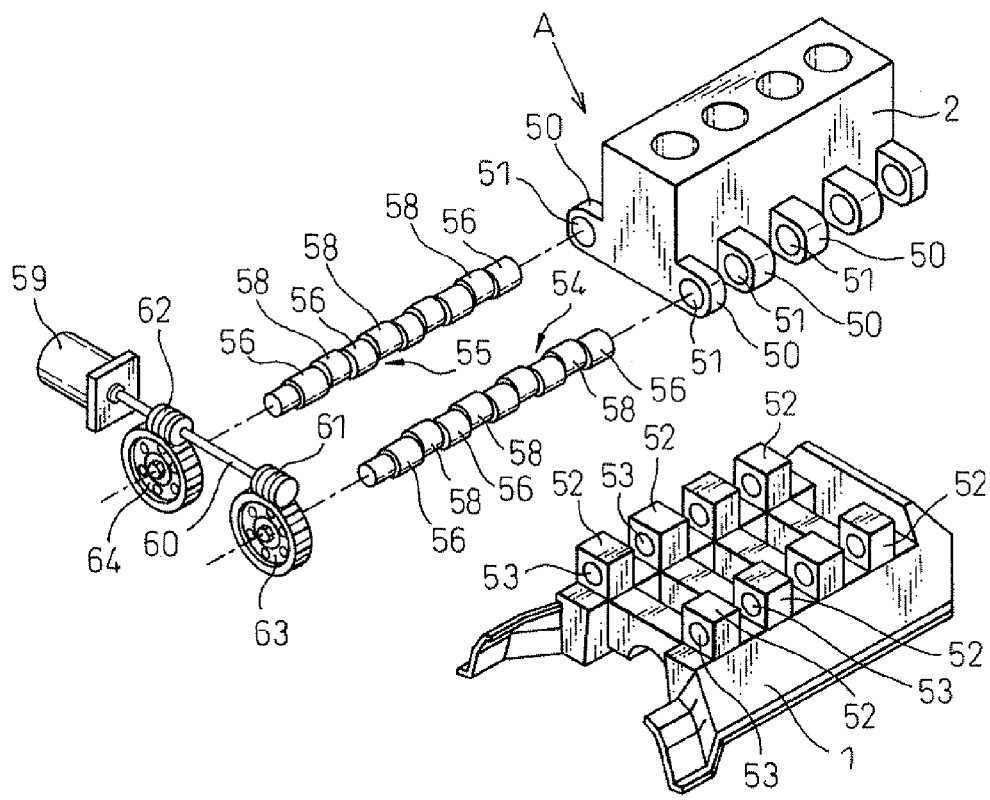
FIG. 2 is a disassembled perspective view of a variable compression ratio mechanism.

FIG. 1 shows a side cross-sectional view of a spark ignition type internal combustion engine.

Referring to FIG. 1, 1 indicates a crank case, cylinder block, 3 a cylinder head, 4 a piston, 5 a combustion chamber, 6 a spark plug arranged at the top center of the combustion chamber 5, 7 an intake valve, 8 an intake port, 9 an exhaust valve, and 10 an exhaust port. The intake port 8 is connected through an intake branch tube 11 to a surge tank 12, while each intake branch tube 11 is provided with a fuel injector 13 for injecting fuel toward a corresponding intake port 8. Note that each fuel injector 13 may be arranged at each combustion chamber 5 instead of being attached to each intake branch tube 11.

The surge tank 12 is connected via an intake duct 14 to an outlet of the compressor 15a of the exhaust turbocharger 15, while an inlet of the compressor 15a is connected through an intake air amount detector 16 using for example a hot wire to an air cleaner. The intake duct 14 is provided inside it with a throttle valve 19 driven by an actuator 18.

On the other hand, an exhaust port 10 is connected through the exhaust manifold 20 to the inlet of the exhaust turbine 15b of the exhaust turbocharger 15, while an outlet of the exhaust turbine 15b is connected through an exhaust pipe 21 to for example a catalytic converter 22 housing a three way catalyst. An air-fuel ratio sensor 23 is arranged in the exhaust pipe 21, and a temperature sensor 24 for detecting the three way catalyst is arranged at the downstream of the catalytic converter 22.

On the other hand, in the embodiment shown in FIG. 1, the connecting part of the crank case 1 and the cylinder block 2 is provided with a variable compression ratio mechanism A able to change the relative positions of the crank case 1 and cylinder block 2 in the cylinder axial direction so as to change the volume of the combustion chamber 5 when the piston 4 is positioned at compression top dead center, and there is further provided with a variable valve timing mechanism B able to individually control the closing timing of the intake valve 7 and the opening timing of the intake valve 7 so as to change the start timing of the actual compression action.

The electronic control unit 30 is comprised of a digital computer provided with components connected with each other through a bidirectional bus 31 such as a ROM (read only memory) 32, RAM (random access memory) 33, CPU (microprocessor) 34, input port 35, and output port 36. The output signal of the intake air amount detector 16, the output signal of the air-fuel ratio sensor 23 and the output signal of the temperature sensor 24 are input through corresponding AD converters 37 to the input port 35. Further, the accelerator pedal 40 is connected to a load sensor 41 generating an output voltage proportional to the amount of depression L of the accelerator pedal 40. The output voltage of the load sensor 41 is input through a corresponding AD converter 37 to the input port 35. Further, the input port 35 is connected to a crank angle sensor 42 generating an output pulse every time the crankshaft rotates by for example 30°. On the other hand, the output port 36 is connected through the drive circuit 38 to a spark plug 6, fuel injector 13, throttle valve drive actuator 18, variable compression ratio mechanism A, and variable valve timing mechanism B.

Figure 3:
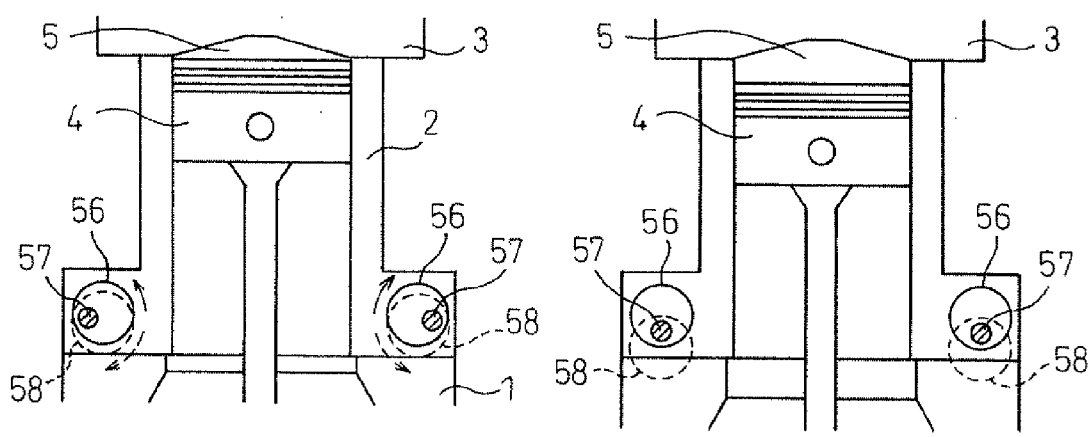
FIG. 3 is a side cross-sectional view of the illustrated internal combustion engine.

FIG. 2 is a disassembled perspective view of the variable compression ratio mechanism A shown in FIG. 1, while FIG. 3 is a side cross-sectional view of the illustrated internal combustion engine. Referring to FIG. 2, at the bottom of the two side walls of the cylinder block 2, a plurality of projecting parts 50 separated from each other by a certain distance are formed. Each projecting part 50 is formed with a circular cross-section cam insertion hole 51. On the other hand, the top surface of the crank case 1 is formed with a plurality of projecting parts 52 separated from each other by a certain distance and fitting between the corresponding projecting parts 50. These projecting parts 52 are also formed with circular cross-section cam insertion holes 53.

As shown in FIG. 2, a pair of cam shafts 54, 55 is provided. Each of the cam shafts 54, 55 has circular cams 56 fixed on it able to be rotatably inserted in the cam insertion holes 51 at every other position. These circular cams 56 are coaxial with the axes of rotation of the cam shafts 54, 55. On the other hand, between the circular cams 56, as shown by the hatching in FIG. 3, extend eccentric shafts 57 arranged eccentrically with respect to the axes of rotation of the cam shafts 54, 55. Each eccentric shaft 57 has other circular cams 58 rotatably attached to it eccentrically. As shown in FIG. 2, these circular cams 58 are arranged between the circular cams 56. These circular cams 58 are rotatably inserted in the corresponding cam insertion holes 53.

When the circular cams 56 fastened to the cam shafts 54, 55 are rotated in opposite directions as shown by the solid line arrows in FIG. 3(A) from the state shown in FIG. 3(A), the eccentric shafts 57 move toward the bottom center, so the circular cams 58 rotate in the opposite directions from the circular cams 56 in the cam insertion holes 53 as shown by the broken line arrows in FIG. 3(A). As shown in FIG. 3(B), when the eccentric shafts 57 move toward the bottom center, the centers of the circular cams 58 move to below the eccentric shafts 57.

As will be understood from a comparison of FIG. 3(A) and FIG. 3(B), the relative positions of the crank case 1 and cylinder block 2 are determined by the distance between the centers of the circular cams 56 and the centers of the circular cams 58. The larger the distance between the centers of the circular cams 56 and the centers of the circular cams 58, the further the cylinder block 2 from the crank case 1. If the cylinder block 2 moves away from the crank case 1, the volume of the combustion chamber 5 when the piston 4 is positioned at compression top dead center increases, therefore by making the cam shafts 54, 55 rotate, the volume of the combustion chamber 5 when the piston 4 is positioned at compression top dead center can be changed.

As shown in FIG. 2, to make the cam shafts 54, 55 rotate in opposite directions, the shaft of a drive motor 59 is provided with a pair of worm gears 61, 62 with opposite thread directions. Gears 63, 64 engaging with these worm gears 61, 62 are fastened to ends of the cam shafts 54, 55. In this embodiment, the drive motor 59 may be driven to change the volume of the combustion chamber 5 when the piston 4 is positioned at compression top dead center over a broad range. Note that the variable compression ratio mechanism A shown from FIG. 1 to FIG. 3 shows an example. Any type of variable compression ratio mechanism may be used.

Figure 4:
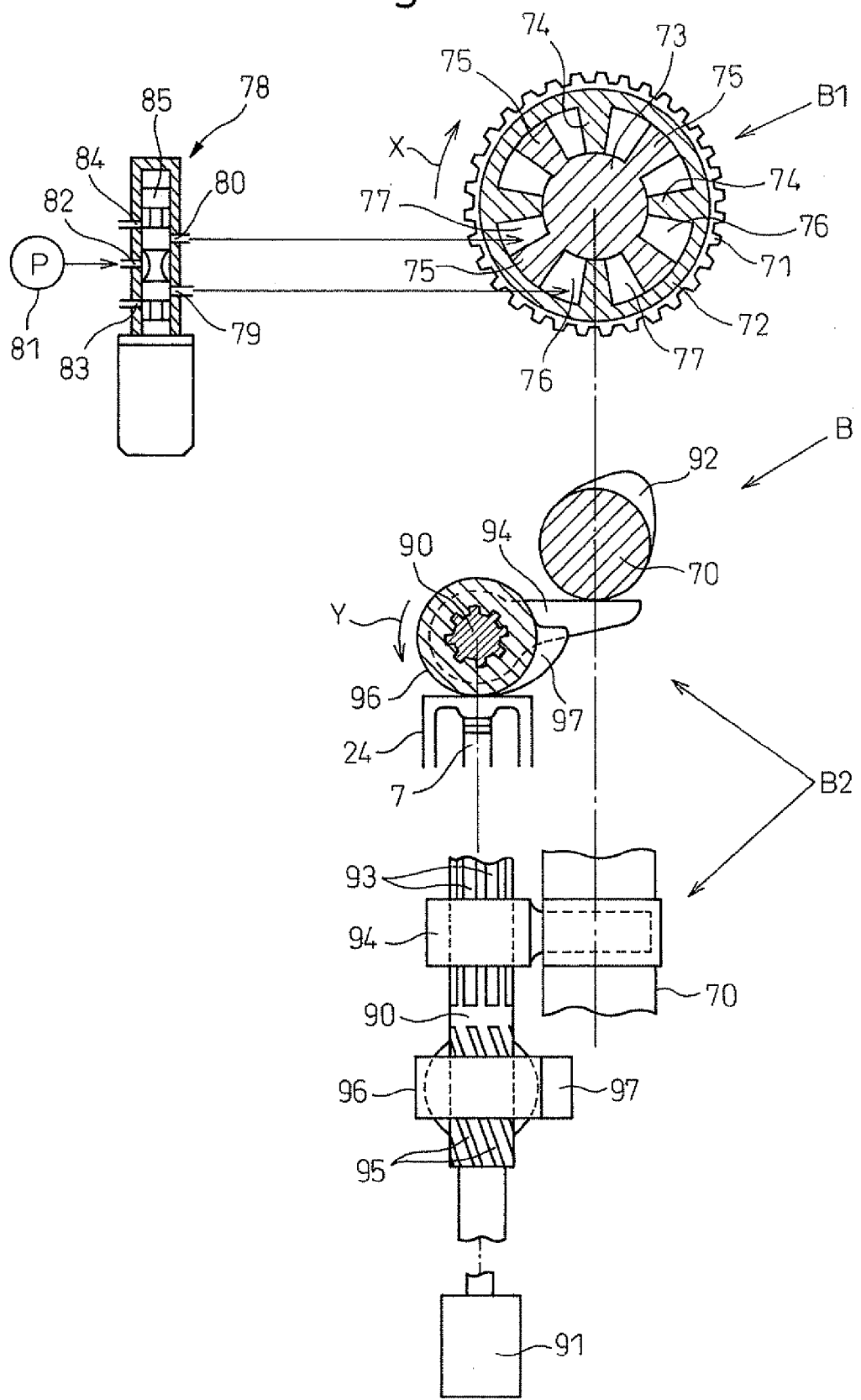
FIG. 4 is a view of a variable valve timing mechanism.

On the other hand, FIG. 4 shows a variable valve timing mechanism B provided at a cam shaft 70 for driving the intake valve 7 in FIG. 1. As shown in FIG. 4, the variable valve timing mechanism B is comprised of a cam phase changer B1 attached to one end of the cam shaft 70 and changing the phase of the cam of the cam shaft 70 and a cam actuation angle changer B2 arranged between the cam shaft 70 and the valve lifter 24 of the intake valve 7 and changing the working angle of the cams of the cam shaft 70 to different working angles for transmission to the intake valve 7. Note that FIG. 4 is a side sectional view and plan view of the cam actuation angle changer B2.

First, explaining the cam phase changer B1 of the variable valve timing mechanism B, this cam phase changer B1 is provided with a timing pulley 71 made to rotate by an engine crank shaft through a timing belt in the arrow direction, a cylindrical housing 72 rotating together with the timing pulley 71, a shaft 73 able to rotate together with a cam shaft 70 and rotate relative to the cylindrical housing 72, a plurality of partitions 74 extending from an inside circumference of the cylindrical housing 72 to an outside circumference of the shaft 73, and vanes 75 extending between the partitions 74 from the outside circumference of the shaft 73 to the inside circumference of the cylindrical housing 72, the two sides of the vanes 75 formed with advancing use hydraulic chambers 76 and retarding use hydraulic chambers 77.

The feed of working oil to the hydraulic chambers 76, 77 is controlled by a working oil feed control valve 78. This working oil feed control valve 78 is provided with hydraulic ports 79, 80 connected to the hydraulic chambers 76, 77, a feed port 82 for working oil discharged from a hydraulic pump 81, a pair of drain ports 83, 84, and a spool valve 85 for controlling connection and disconnection of the ports 79, 80, 82, 83, and 84.

To advance the phase of the cam of the cam shaft 70, in FIG. 4, the spool valve 85 is made to move downward, working oil fed from the feed port 82 is fed through the hydraulic port 79 to the hydraulic chambers for advancing 76, and working oil in the hydraulic chambers for retarding 77 is drained from the drain port 84. At this time, the shaft 73 is made to rotate relative to the cylindrical housing 72 in the arrow X-direction.

As opposed to this, to retard the phase of the cam of the cam shaft 70, in FIG. 4, the spool valve 85 is made to move upward, working oil fed from the feed port 82 is fed through the hydraulic port 80 to the hydraulic chambers for retarding 77, and working oil in the hydraulic chambers for advancing 76 is drained from the drain port 83. At this time, the shaft 73 is made to rotate relative to the cylindrical housing 72 in the direction opposite to the arrows X.

When the shaft 73 is made to rotate relative to the cylindrical housing 72, if the spool valve 85 is returned to the neutral position shown in FIG. 4, the operation for relative rotation of the shaft 73 is ended, and the shaft 73 is held at the relative rotational position at that time. Therefore, it is possible to use the cam phase changer B1 so as to advance or retard the phase of the cam of the cam shaft 70 by exactly the desired amount. That is, the cam phase changer B1 can freely advance or delay the opening timing of the intake valve 7.

Next, explaining the cam actuation angle changer B2 of the variable valve timing mechanism B, this cam actuation angle changer B2 is provided with a control rod 90 arranged in parallel with the cam shaft 70 and made to move by an actuator 91 in the axial direction, an intermediate cam 94 engaging with a cam 92 of the cam shaft 70 and slidingly fitting with a spline 93 formed on the control rod 90 and extending in the axial direction, and a swing cam 96 engaging with a valve lifter 24 for driving the intake valve 7 and slidingly fitting with a spline 95 extending in a spiral formed on the control rod 90. The swing cam 96 is formed with a cam 97.

When the cam shaft 70 rotates, the cam 92 causes the intermediate cam 94 to rock by exactly a constant angle at all times. At this time, the swing cam 96 is also made to rock by exactly a constant angle. On the other hand, the intermediate cam 94 and swing cam 96 are supported in immovably in the axial direction of the control rod 90, therefore when the control rod 90 is made to move by the actuator 91 in the axial direction, the swing cam 96 is made to rotate relative to the intermediate cam 94.

When the cam 92 of the cam shaft 70 starts to engage with the intermediate cam 94 due to the relative rotational positional relationship between the intermediate cam 94 and swing cam 96, if the cam 97 of the swing cam 96 starts to engage with the valve lifter 24, as shown by a in FIG. 5(B), the opening time and lift of the intake valve 7 become maximum. As opposed to this, when the actuator 91 is used to make the swing cam 96 rotate relative to the intermediate cam 94 in the arrow Y-direction of FIG. 4, the cam 92 of the cam shaft 70 engages with the intermediate cam 94, then after a while the cam 97 of the sliding cam 96 engages with the valve lifter 24. In this case, as shown by b in FIG. 5(B), the opening time and amount of lift of the intake valve 7 become smaller than a.

When the swing cam 96 is made to rotate relative to the intermediate cam 94 in the arrow Y-direction of FIG. 4, as shown by c in FIG. 5(B), the opening time and amount of lift of the intake valve 7 become further smaller. That is, by using the actuator 91 to change the relative rotational position of the intermediate cam 94 and swing cam 96, the opening time of the intake valve 7 can be freely changed. However, in this case, the amount of the lift of the intake valve 7 becomes smaller the shorter the opening time of the intake valve 7.

The cam phase changer B1 can be used to freely change the opening timing of the intake valve 7 and the cam actuation angle changer B2 can be used to freely change the opening time of the intake valve 7 in this way, so both the cam phase changer B1 and cam actuation angle changer B2, that is, the variable valve timing mechanism B, may be used to freely change the opening timing and opening time of the intake valve 7, that is, the opening timing and closing timing of the intake valve 7.

Note that the variable valve timing mechanism B shown in FIG. 1 and FIG. 4 show an example. It is also possible to use various types of variable valve timing mechanisms other than the example shown in FIG. 1 and FIG. 4.

Next, the meaning of the terms used in the present application will be explained with reference to FIG. 6. Note that FIG. 6(A), (B), (C), and (D) show for explanatory purposes an engine with a volume of the combustion chambers of 50 ml and a stroke volume of the piston of 500 ml. In these FIG. 6(A), (B), (C), and (D), the combustion chamber volume shows the volume of the combustion chamber when the piston is at compression top dead center.

FIG. 6(A) explains the mechanical compression ratio. The mechanical compression ratio is a value determined mechanically from the stroke volume of the piston and combustion chamber volume at the time of a compression stroke. This mechanical compression ratio is expressed by (combustion chamber volume+stroke volume)/combustion chamber volume. In the example shown in FIG. 6(A), this mechanical compression ratio becomes (50 ml+500 ml)/50 ml=11.

FIG. 6(B) explains the actual compression ratio. This actual compression ratio is a value determined from the actual stroke volume of the piston from when the compression action is actually started to when the piston reaches top dead center and the combustion chamber volume. This actual compression ratio is expressed by (combustion chamber volume+actual stroke volume)/combustion chamber volume. That is, as shown in FIG. 6(B), even if the piston starts to rise in the compression stroke, no compression action is performed while the intake valve is opened. The actual compression action is started after the intake valve closes. Therefore, the actual compression ratio is expressed as follows using the actual stroke volume. In the example shown in FIG. 6(B), the actual compression ratio becomes (50 ml+450 ml)/50 ml=10.

FIG. 6(C) explains the expansion ratio. The expansion ratio is a value determined from the stroke volume of the piston at the time of an expansion stroke and the combustion chamber volume. This expansion ratio is expressed by the (combustion chamber volume+stroke volume)/combustion chamber volume. In the example shown in FIG. 6(C), this expansion ratio becomes (50 ml+500 ml)/50 ml=11.

FIG. 6(D) explains the actual expansion ratio. This actual expansion ratio is the value determined from the combustion chamber volume and the actual exhaust stroke volume from when the expansion action is started to when the expansion action actually ends, that is, to when the exhaust valve 9 opens. This actual expansion ratio is expressed as (combustion chamber volume+actual exhaust stroke volume)/combustion chamber volume. In the example shown in FIG. 6(D), the actual expansion ratio becomes (50 ml+450 ml)/50 ml=10.

Next, the superhigh expansion ratio cycle used in the present invention will be explained with reference to FIG. 7 and FIG. 8. Note that FIG. 7 shows the relationship between the theoretical thermal efficiency and the expansion ratio, while FIG. 8 shows a comparison between the ordinary cycle and superhigh expansion ratio cycle used selectively in accordance with the load in the present invention.

FIG. 8(A) shows the ordinary cycle when the intake valve closes near the bottom dead center and the compression action by the piston is started from near substantially compression bottom dead center. In the example shown in this FIG. 8(A) as well, in the same way as the examples shown in FIG. 6(A), (B), (C), and (D), the combustion chamber volume is made 50 ml, and the stroke volume of the piston is made 500 ml. As will be understood from FIG. 8(A), in an ordinary cycle, the mechanical compression ratio is (50 ml+500 ml)/50 ml=11, the actual compression ratio is also about 11, and the expansion ratio and the actual expansion ratio also become (50 ml+500 ml)/50 ml=11. That is, in an ordinary internal combustion engine, the mechanical compression ratio and actual compression ratio and the expansion ratio and the actual expansion ratio become substantially equal.

Figure 7:
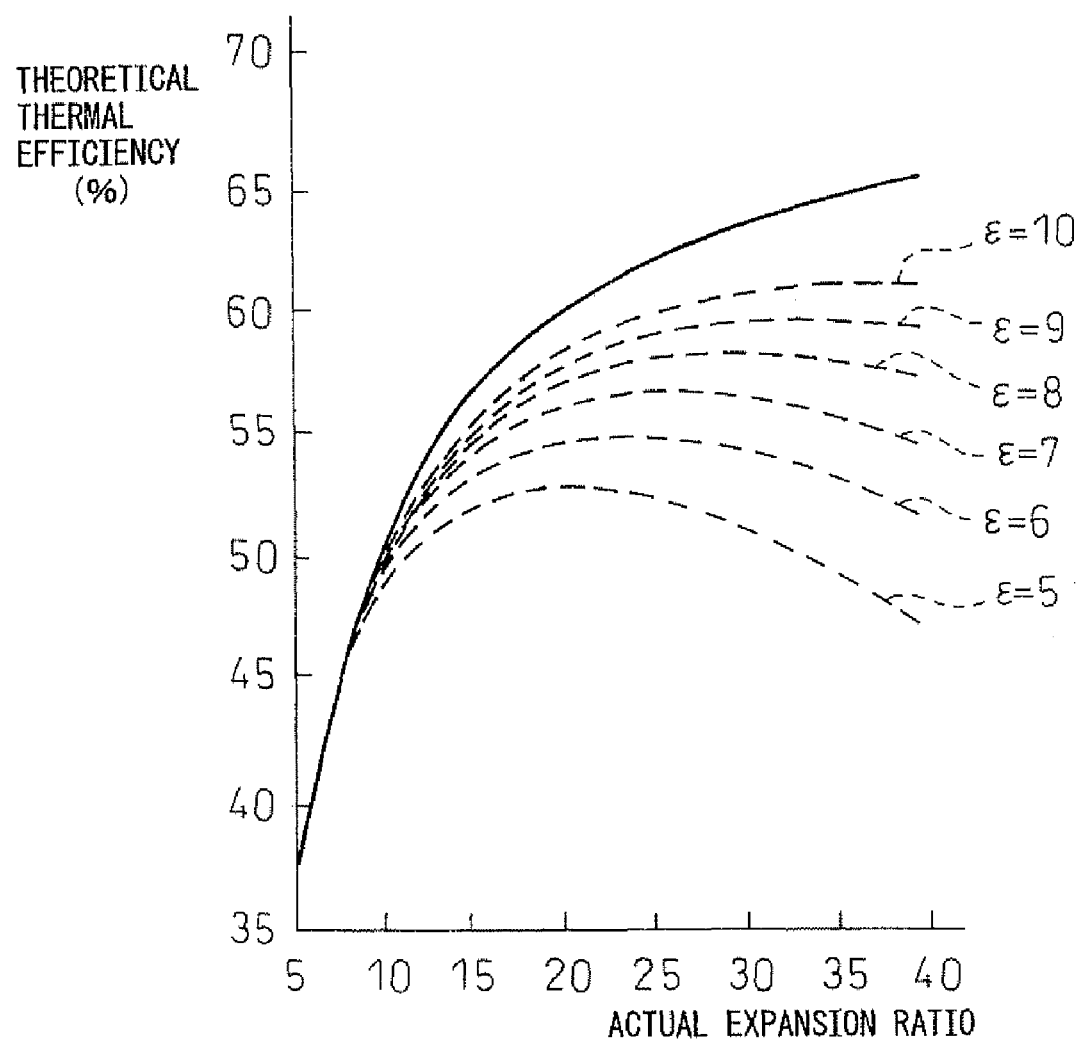
FIG. 7 is a view showing the relationship between the theoretical thermal efficiency and expansion ratio.
Figure 8:
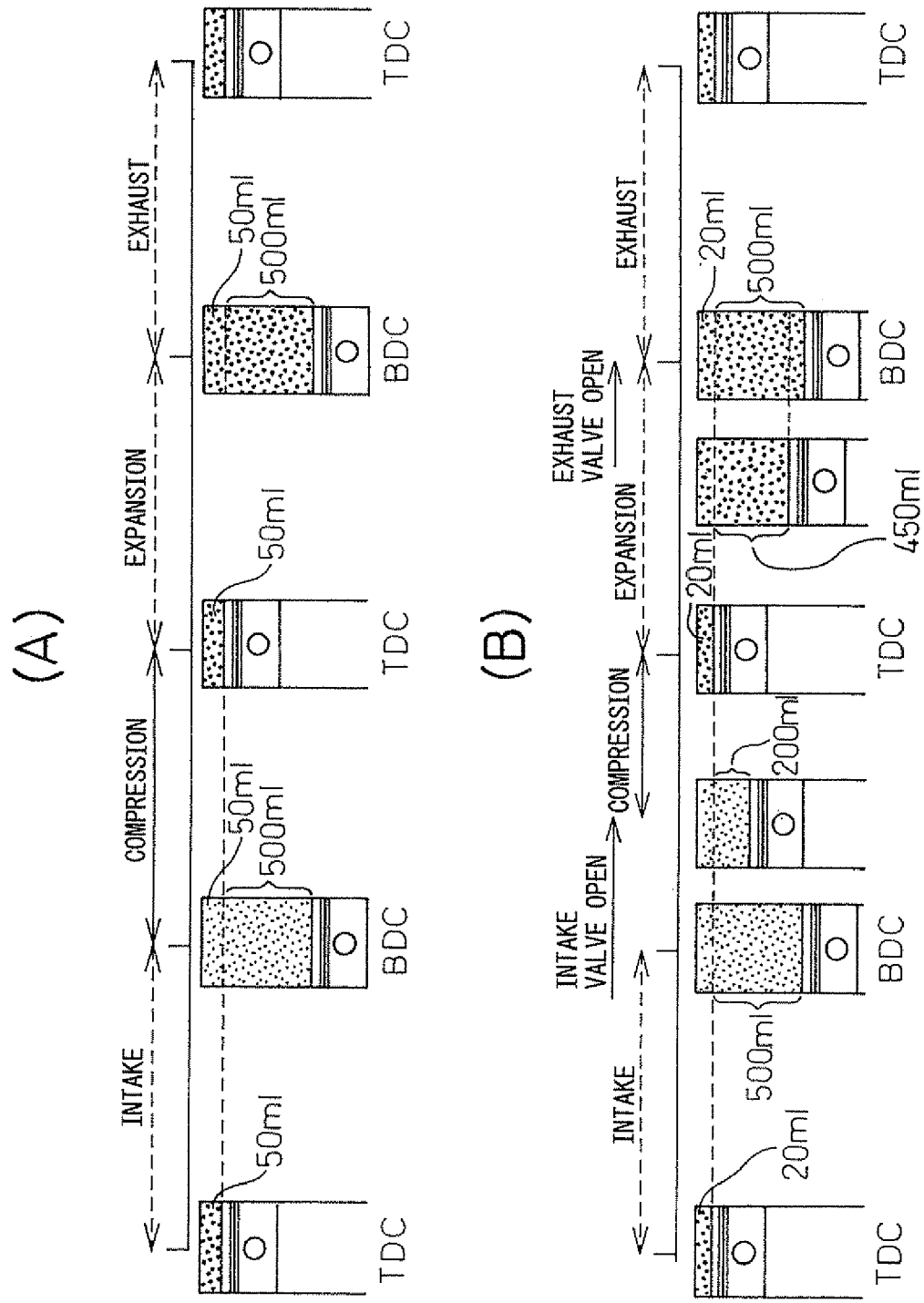
FIG. 8 is a view for explaining an ordinary cycle and superhigh expansion ratio cycle.

The solid line in FIG. 7 shows the change in the theoretical thermal efficiency in the case where the actual compression ratio and actual expansion ratio are substantially equal, that is, in the ordinary cycle. In this case, it is learned that the larger the actual expansion ratio, that is, the higher the actual compression ratio, the higher the theoretical thermal efficiency.

Therefore, in an ordinary cycle, to raise the theoretical thermal efficiency, the actual compression ratio should be made higher. However, due to the restrictions on the occurrence of knocking at the time of engine high load operation, the actual compression ratio can only be raised even at the maximum to about 12, accordingly, in an ordinary cycle, the theoretical thermal efficiency cannot be made sufficiently high.

On the other hand, under this situation, the inventors strictly differentiated between the mechanical compression ratio and actual compression ratio and studied the theoretical thermal efficiency and as a result discovered that in the theoretical thermal efficiency, the actual expansion ratio is dominant, and the theoretical thermal efficiency is not affected much at all by the actual compression ratio. That is, if raising the actual compression ratio, the explosive force rises, but compression requires a large energy, accordingly even if raising the actual compression ratio, the theoretical thermal efficiency will not rise much at all.

As opposed to this, if increasing the actual expansion ratio, the longer the period during which a force acts pressing down the piston at the time of the expansion stroke, the longer the time that the piston gives a rotational force to the crankshaft. Therefore, the larger the actual expansion ratio is made, the higher the theoretical thermal efficiency becomes. The broken line $\epsilon=10$ in FIG. 7 shows the theoretical thermal efficiency in the case of fixing the actual compression ratio at 10 and raising the actual expansion ratio in that state. In this way, it is learned that the amount of rise of the theoretical thermal efficiency when raising the actual expansion ratio in the state where the actual compression ratio is maintained at a low value and the amount of rise of the theoretical thermal efficiency in the case where the actual compression ratio is increased along with the actual expansion ratio as shown by the solid line of FIG. 7 will not differ that much.

If the actual compression ratio is maintained at a low value in this way, knocking will not occur, therefore if raising the actual expansion ratio in the state where the actual compression ratio is maintained at a low value, the occurrence of knocking can be prevented and the theoretical thermal efficiency can be greatly raised. FIG. 8(B) shows an example of the case when using the variable compression ratio mechanism A and variable valve timing mechanism B to maintain the actual compression ratio at a low value and raise the actual expansion ratio.

Referring to FIG. 8(B), in this example, the variable compression ratio mechanism A is used to lower the combustion chamber volume from 50 ml to 20 ml. On the other hand, the variable valve timing mechanism B is used to delay the closing timing of the intake valve until the actual stroke volume of the piston changes from 500 ml to 200 ml. As a result, in this example, the actual compression ratio becomes (20 ml+200 ml)/20 ml=11.

On the other hand, FIG. 8(B) shows the case where the exhaust valve 9 opens near bottom dead center and the case where the exhaust valve 9 opens when the stroke volume is 450 ml. When the exhaust valve 9 opens near bottom dead center, the actual expansion ratio becomes (20 ml+500 ml)/20 ml=26, while when the exhaust valve 9 opens when the stroke volume is 450 ml, the actual expansion ratio becomes (20 ml+450 ml)/20 ml=23.5. In the usual cycle shown in FIG. 8(A), as explained above, the actual compression ratio is about 11 and the actual expansion ratio is 11. Compared with this case, in the case shown in FIG. 8(B), it is learned that only the actual expansion ratio is raised to 26 or 23.5. This is called the "superhigh expansion ratio cycle".

In an internal combustion engine, generally speaking, the lower the engine load, the worse the thermal efficiency, therefore to improve the thermal efficiency at the time of engine operation, that is, to improve the fuel consumption, it becomes necessary to improve the thermal efficiency at the time of engine low load operation. On the other hand, in the superhigh expansion ratio cycle shown in FIG. 8(B), the actual stroke volume of the piston at the time of the compression stroke is made smaller, so the amount of intake air which can be sucked into the combustion chamber 5 becomes smaller, therefore this superhigh expansion ratio cycle can only be employed when the engine load is relatively low. Therefore, in the present invention, when the engine load is relatively low, the superhigh expansion ratio cycle shown in FIG. 8(B) is set, while at the time of engine high load operation, the ordinary cycle shown in FIG. 8(A) is set.

Next, the operational control as a whole when the three way catalyst is sufficiently activated will be explained with reference to FIG. 9.

Figure 9:
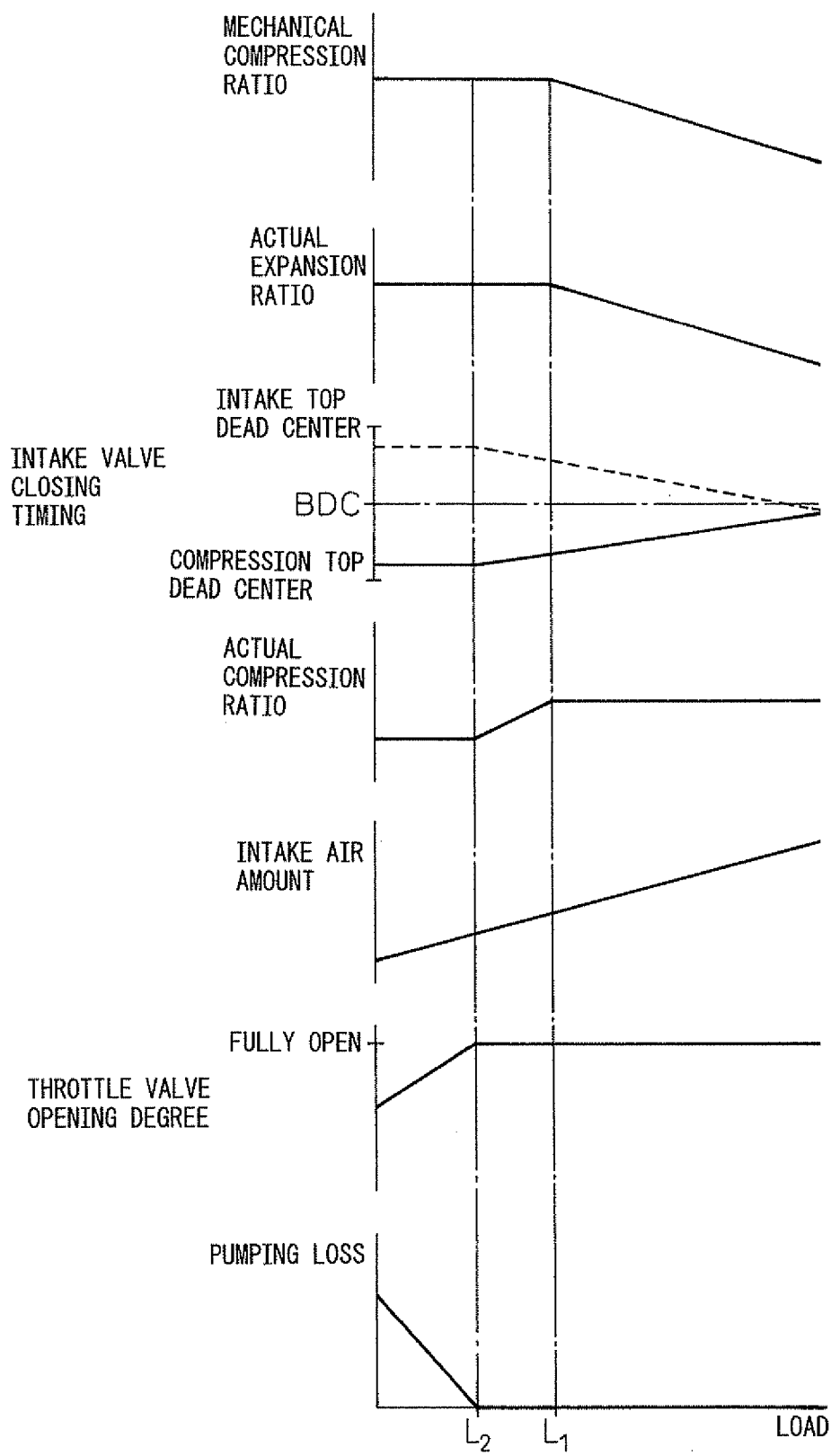
FIG. 9 is a view showing the change in mechanical compression ratio etc. in accordance with the engine load.

FIG. 9 shows the changes in the mechanical compression ratio, actual expansion ratio, closing timing of the intake valve 7, actual compression ratio, the amount of intake air, opening degree of the throttle valve 17, and pumping loss along with the engine load under a certain engine speed. Note that in the embodiment according to the present invention, ordinarily the average air-fuel ratio in the combustion chamber 5 is feedback controlled to the stoichiometric air-fuel ratio based on the output signal of the air-fuel ratio sensor 23 so that the three-way catalyst in the catalytic converter 22 can simultaneously reduce the unburned HC, CO, and $NO_x$ in the exhaust gas.

Now, as explained above, at the time of engine high load operation, the ordinary cycle shown in FIG. 8(A) is executed. Therefore, as shown in FIG. 9, at this time, since the mechanical compression ratio is made low, the actual expansion ratio becomes low. As shown by the solid line in FIG. 9, the closing timing of the intake valve 7 is advanced. Further, at this time, the amount of intake air is large. At this time, the opening degree of the throttle valve 17 is maintained fully opened or substantially fully opened, so the pumping loss becomes zero.

On the other hand, as shown by the solid line in FIG. 9, when the engine load becomes lower, the closing timing of the intake valve 7 is retarded so as to reduce the intake air amount along with that. Further, at that time, the mechanical compression ratio is increased as the engine load becomes lower as shown in FIG. 9 so that the actual compression ratio is maintained substantially constant. Therefore, the expansion ratio is also increased as the engine load becomes lower. Note that at this time as well, the throttle valve 19 is held in the fully open or substantially fully open state. Therefore, the intake air amount fed into the combustion chamber 5 is controlled by changing the closing timing of the intake valve 7 without relying on the throttle valve 19. At this time as well, the pumping loss becomes zero.

In this way, when the engine load becomes lower from the engine high load operation state, the mechanical compression rate is made to increase along with the reduction in the intake air amount under a substantially constant actual compression ratio. That is, the volume of the combustion chamber 5 when the piston 4 reaches compression top dead center is reduced proportionally to the reduction in the intake air amount. Therefore, the volume of the combustion chamber 5 when the piston 4 reaches compression top dead center changes in proportion to the intake air amount. Note that the air-fuel ratio in the combustion chamber 5 at this time becomes the stoichiometric air-fuel ratio, so the volume of the combustion chamber 5 when the piston 4 reaches compression top dead center changes in proportion to the fuel amount.

If the engine load becomes further lower, the mechanical compression ratio is further made to increase. When the engine load falls to the medium load $L_1$ closer to low load, the mechanical compression ratio reaches the limit mechanical compression ratio constituting the structural limit of the combustion chamber 5. When the mechanical compression ratio reaches the limit mechanical compression ratio, in the region of a load lower than the engine load $L_1$ where the mechanical compression ratio reaches the limit mechanical compression ratio, the mechanical compression ratio is held at the limit mechanical compression ratio. Therefore, at the time of low load side engine medium load operation and at the time of engine low load operation, the mechanical compression ratio becomes maximum and the actual expansion ratio also becomes maximum. In other words, at the time of low load side engine medium load operation, the mechanical compression ratio is made maximum so that the maximum actual expansion ratio is obtained.

On the other hand, in the embodiment shown in FIG. 9, even when the engine load becomes lower than $L_1$, as shown by the solid line in FIG. 9, the closing timing of the intake valve 7 is retarded as the engine load becomes lower. When the engine load falls to $L_2$, the closing timing of the intake valve 7 becomes the limit closing timing where the intake air amount fed into the combustion chamber 5 can be controlled. When the closing timing of the intake valve 7 reaches the limit closing timing, in the region of a load lower than the engine load $L_2$ when the closing timing of the intake valve 7 reaches the limit closing timing, the closing timing of the intake valve 7 is held at the limit closing timing.

When the closing timing of the intake valve 7 is held at the limit closing timing, the intake air amount no longer can be controlled by changing the closing timing of the intake valve 7. In the embodiment shown in FIG. 9, at this time, that is, in the region of a load lower than the engine load $L_2$ when the closing timing of the intake valve 7 reaches the limit closing timing, the intake air amount fed into the combustion chamber 5 is controlled by the throttle valve 19. However, if the intake air amount is controlled by the throttle valve 19, the pumping loss increases as shown in FIG. 9.

On the other hand, as shown in FIG. 9, at the high load operation side where the engine load is higher than $L_1$, the actual compression ratio is maintained at substantially the same actual compression ratio for the same engine speed. As opposed to this, when the engine load is lower than $L_2$, that is, when a mechanical compression ratio is held at a limit mechanical compression ratio, the actual compression ratio is determined by the closing timing of the intake valve 7. If the closing timing of the intake valve 7 is retarded as in the engine load between $L_1$ and $L_2$, the actual compression ratio falls. If the closing timing of the intake valve 7 is held at the limit closing timing as in the engine load lower than $L_2$, the actual compression ratio is maintained constant.

On the other hand, as shown by the broken line in FIG. 9, it is possible to control the intake air amount without regard to the throttle valve 19 by advancing the closing timing of the intake valve 7 as the engine load becomes lower. Therefore, expressing this so that both the case shown by the solid line in FIG. 9 and the case shown by the broken line are covered, in the embodiment of the present invention, the closing timing of the intake valve 7 is made to shift as the engine load becomes lower in the direction away from the intake bottom dead center BDC until the limit closing timing $L_2$ enabling control of the intake air amount fed into the combustion chamber.

Now, when the temperature of the three-way catalyst in the catalytic converter 22 falls and becomes less than the activation temperature, the exhaust gas is no longer purified, therefore the three-way catalyst has to be held at the activation temperature or more. On the other hand, as will be understood from FIG. 7, when the actual expansion ratio falls, the theoretical thermal efficiency falls and the exhaust gas temperature becomes higher. Therefore, in the present invention, when it is predicted that the temperature of the three-way catalyst will fall to less than the activation temperature, the actual expansion ratio is lowered and thereby the exhaust gas temperature is raised to hold the temperature of the three-way catalyst at the activation temperature or more.

In this regard, if the actual compression ratio ends up falling when lowering the actual expansion ratio, the ignition and combustion of the fuel will end up deteriorating. Therefore, in the present invention, at this time, the actual expansion ratio is lowered while maintaining the actual compression ratio the same or while increasing the actual compression ratio.

Figure 10:
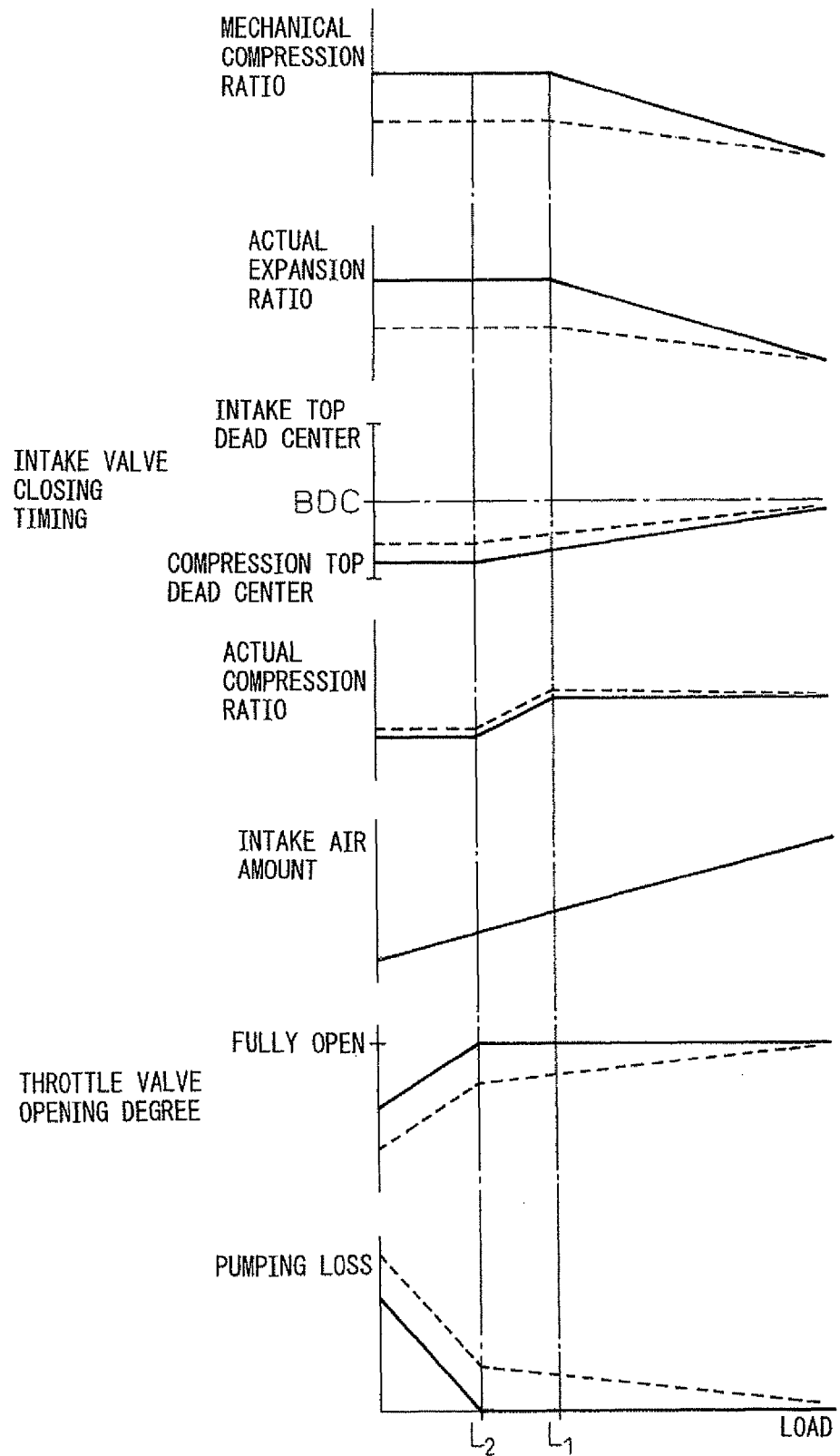
FIG. 10 is a view showing a change in the mechanical compression ratio etc. in accordance with the engine load.

FIG. 10 shows an embodiment lowering the mechanical compression ratio and thereby lowering the actual expansion ratio when it is predicted that the temperature of the three-way catalyst will fall to less than the activation temperature. Note that in FIG. 10, the solid line shows the solid line in FIG. 9, that is, the values when the three-way catalyst is activated. In FIG. 10, the broken line shows the values in the case of raising the temperature of the three-way catalyst.

As will be understood from FIG. 10, in this embodiment, when the three-way catalyst should be raised in temperature, the mechanical compression ratio is lowered from the value shown by the solid line to the value shown by the broken line. At this time, the actual expansion ratio from the value shown by the solid line to the value shown by the broken line. On the other hand, in this embodiment, at this time, the actual compression ratio is raised from the value shown by the solid line to the value shown by the broken line. To this end, the closing timing of the intake valve 7 is made to shift from the solid line to the broken line in a direction approaching intake bottom dead center and the opening degree of the throttle valve 19 is made smaller from the solid line to the broken line.

Figure 11:
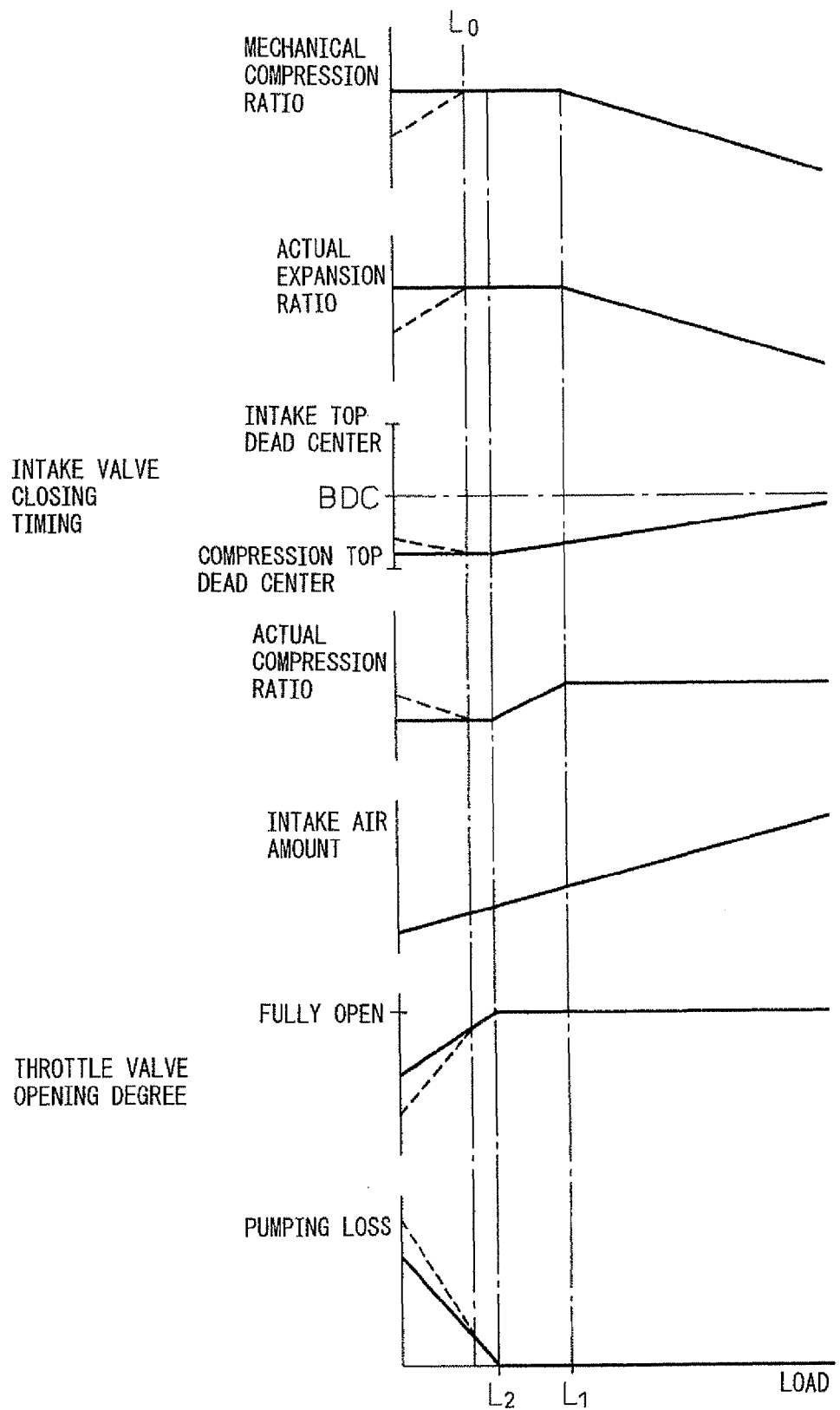
FIG. 11 is a view showing a change in the mechanical compression ratio etc. in accordance with the engine load.

FIG. 11 shows another embodiment lowering the mechanical compression ratio to lower the expansion ratio when it is predicted that the temperature of the three-way catalyst falls to less than the activation temperature. Note that in FIG. 11, the solid line shows the solid line in FIG. 9, that is, shows the values in the case where the three-way catalyst is activated. In FIG. 11, the broken line shows the values in the case of raising the temperature of the three-way catalyst.

In this embodiment as well, when raising the temperature of the three-way catalyst, the mechanical compression ratio is lowered from the value shown by the solid line to the value shown by the broken line. At this time, the actual expansion ratio is lowered from the value shown by the solid line to the value shown by the broken line. Further, in this embodiment as well, the actual compression ratio is raised from the value shown by the solid line to the value shown by the broken line. To this end, the closing timing of the intake valve 7 is made to shift from the solid line to the broken line in a direction approaching intake bottom dead center and the opening degree of the throttle valve 19 is made smaller from the solid line to the broken line.

In this embodiment, unlike the embodiment shown in FIG. 10, the mechanical compression ratio is lowered to raise the temperature of the three-way catalyst only when the engine load is lower than a predetermined load $L_0$. Further, in this case, the lower the engine load, the greater the amount of reduction of the mechanical compression ratio is made. That is, when the engine load is higher than $L_0$, it is believed that the temperature of the three-way catalyst will never become less than the activation temperature. Therefore, in this embodiment, when the engine load is higher than $L_0$, there is no temperature raising action of the three-way catalyst regardless of the temperature of the three-way catalyst.

On the other hand, in the region where the engine load is lower than $L_0$, if the engine load becomes lower, the exhaust gas temperature becomes lower and the amount of exhaust gas becomes smaller. Therefore, when it is predicted that the temperature of the three-way catalyst will fall to less than the activation temperature, to hold the temperature of the three-way catalyst at the activation temperature, the lower the engine load becomes, the more the exhaust gas temperature has to be raised. Therefore, in this embodiment, when it is predicted that the temperature of the three-way catalyst will fall to less than the activation temperature, the lower the engine load, the more the amount of reduction of mechanical compression ratio is made and thereby the lower the engine load, the greater the amount of reduction of the actual expansion ratio is made.

Figure 12:
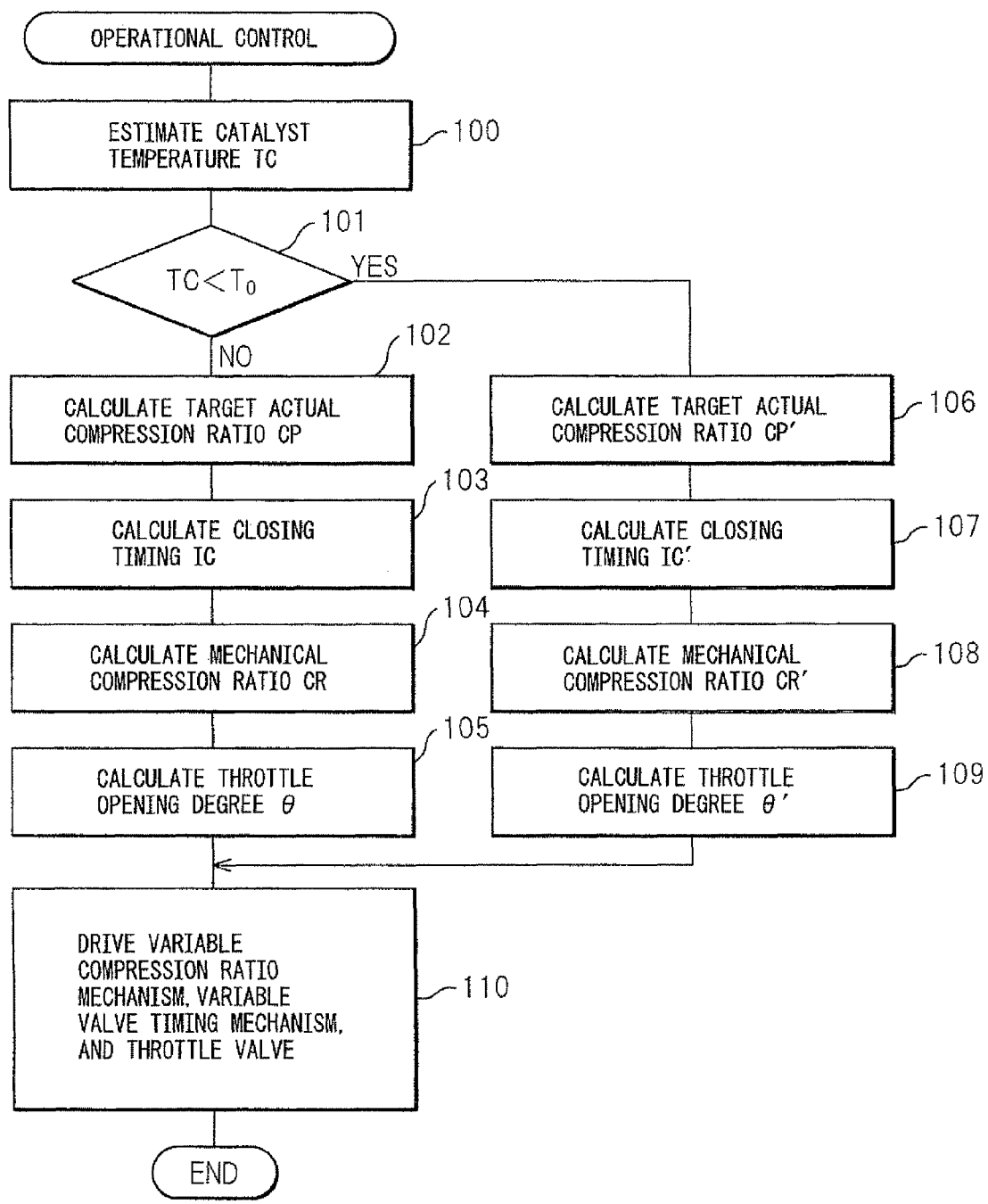
FIG. 12 is a flowchart for operational control.

FIG. 12 shows an operational control routine able to be applied to any of the embodiments shown in FIG. 10 and FIG. 11. If referring to FIG. 12, first, at step 100, the temperature TC of the three-way catalyst is estimated from the output signal of the temperature sensor 24. Next, at step 101, it is judged if the temperature TC of the three way catalyst becomes lower than a temperature $T_0$ at which it is predicted that the temperature TC of the three-way catalyst falls to less than the activation temperature, for example, a temperature $T_0$ just slightly higher than the temperature at which the three-way catalyst becomes activated. When $TC \geq T_0$, that is, when the three-way catalyst is sufficiently activated, the routine proceeds to step 102 where the operational control shown in FIG. 9 is performed.

That is, at step 102, the target actual compression ratio CP is calculated. Next, at step 103, the closing timing IC of the intake valve 7 is calculated from the map shown in FIG. 13(A). That is, the closing timing IC of the intake valve 7 required for feeding the required intake air amount into the combustion chamber 5 is stored as a function of the engine load L and engine speed N in the form of the map as shown in FIG. 13(A) in advance in the ROM 32. The closing timing IC of the intake valve 7 is calculated from the map.

Next, at step 104, the mechanical compression ratio CR is calculated. Next, at step 105, the opening degree of the throttle valve 17 is calculated. The opening degree θ of this throttle valve 17 is stored as a function of the engine load L and engine speed N in the form of a map as shown in FIG. 13(B) in advance in the ROM 32. Next, at step 110, the variable compression ratio mechanism A is controlled so that the mechanical compression ratio becomes the mechanical compression ratio CR, the variable valve timing mechanism B is controlled so that the closing timing of the intake valve 7 becomes the closing timing IC, and the throttle valve 17 is controlled so that the opening degree of the throttle valve 17 becomes the opening degree θ.

As opposed to this, when it is judged at step 101 that $TC < T_0$, that is, when it is predicted that the temperature of the three-way catalyst will fall to less than the activation temperature, the routine proceeds to step 106 where the operation control is switched to the operational control shown by the broken line of FIG. 10. Note that, in the embodiment shown in FIG. 11, when the engine load is lower than $L_0$ and $TC<T_0$, the routine proceeds to step 106 where the operational control is switched to the operational control shown by the broken line of FIG. 11.

That is, first, at step 106, the target actual compression ratio CP' is calculated. Next, at step 107, the closing timing IC' of the intake valve 7 is calculated from the map shown in FIG. 14(A). That is, in this case as well, the closing timing IC' of the intake valve 7 required for feeding the required intake air amount to the inside of the combustion chamber 5 is stored as a function of the engine load L and engine speed N in the form of the map as shown in FIG. 14(A) in advance in the ROM 32. The closing timing IC' of the intake valve 7 is calculated from the map.

Next, at step 108, the mechanical compression ratio CR' is calculated. Next, at step 109, the opening degree of the throttle valve 19 is calculated. This opening degree θ' of the throttle valve 19 is also stored as a function of the engine load L and engine speed N in the form of a map as shown in FIG. 14(B) in advance in the ROM 32. Next, at step 110, the variable compression ratio mechanism A is controlled so that the mechanical compression ratio becomes the mechanical compression ratio CR', the variable valve timing mechanism B is controlled so that the closing timing of the intake valve 7 becomes the closing timing IC', and the throttle valve 19 is controlled so that the opening degree of the throttle valve 19 becomes the opening degree θ'. Note that, at this time, the ignition timing may also be retarded so as to further raise the exhaust gas temperature.

Figure 15:
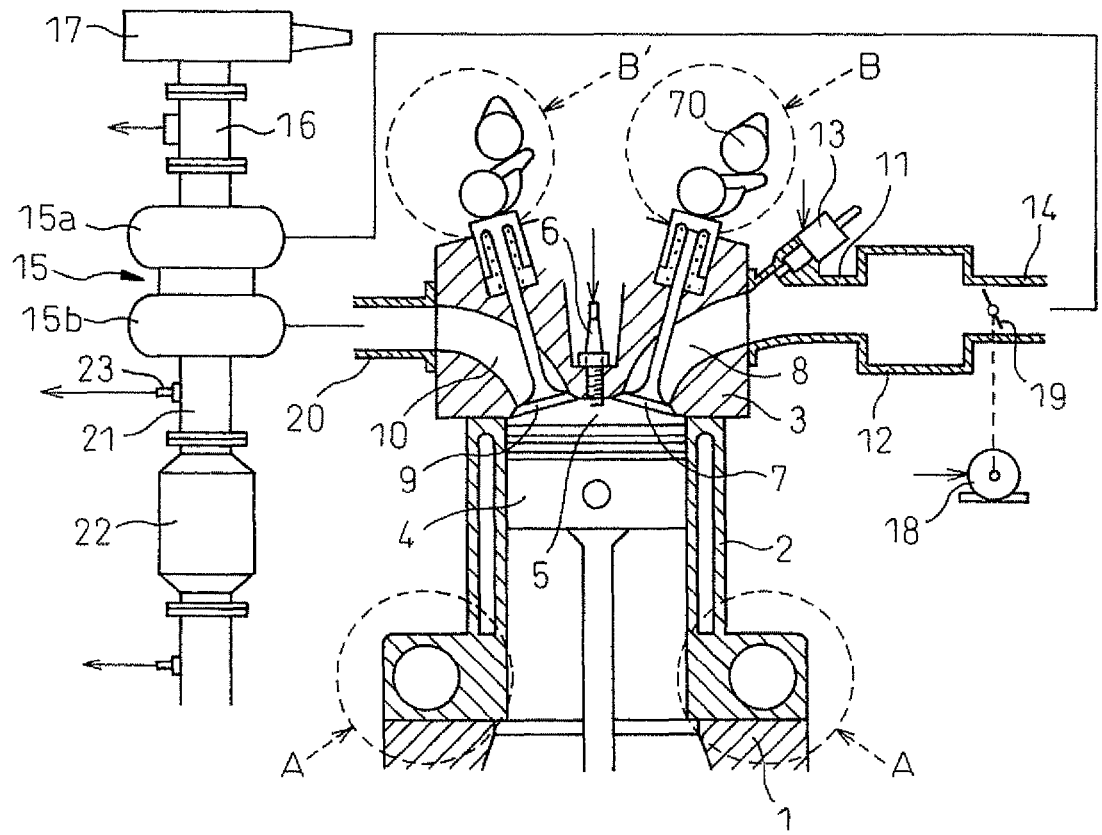
FIG. 15 is an overview showing another embodiment of a spark ignition type internal combustion engine.
Figure 16:
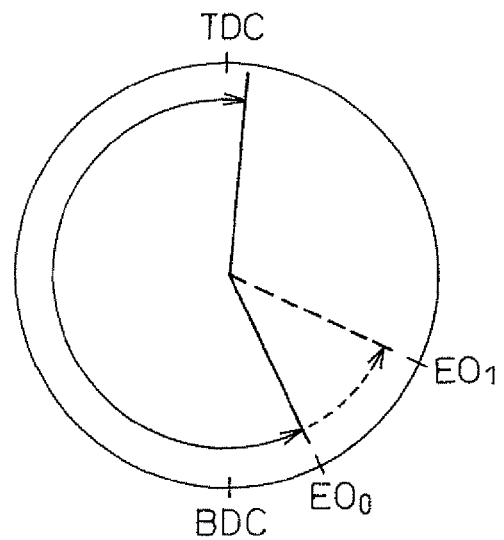
FIG. 16 is a view showing an opening timing EO of the exhaust valve.
Figure 17:
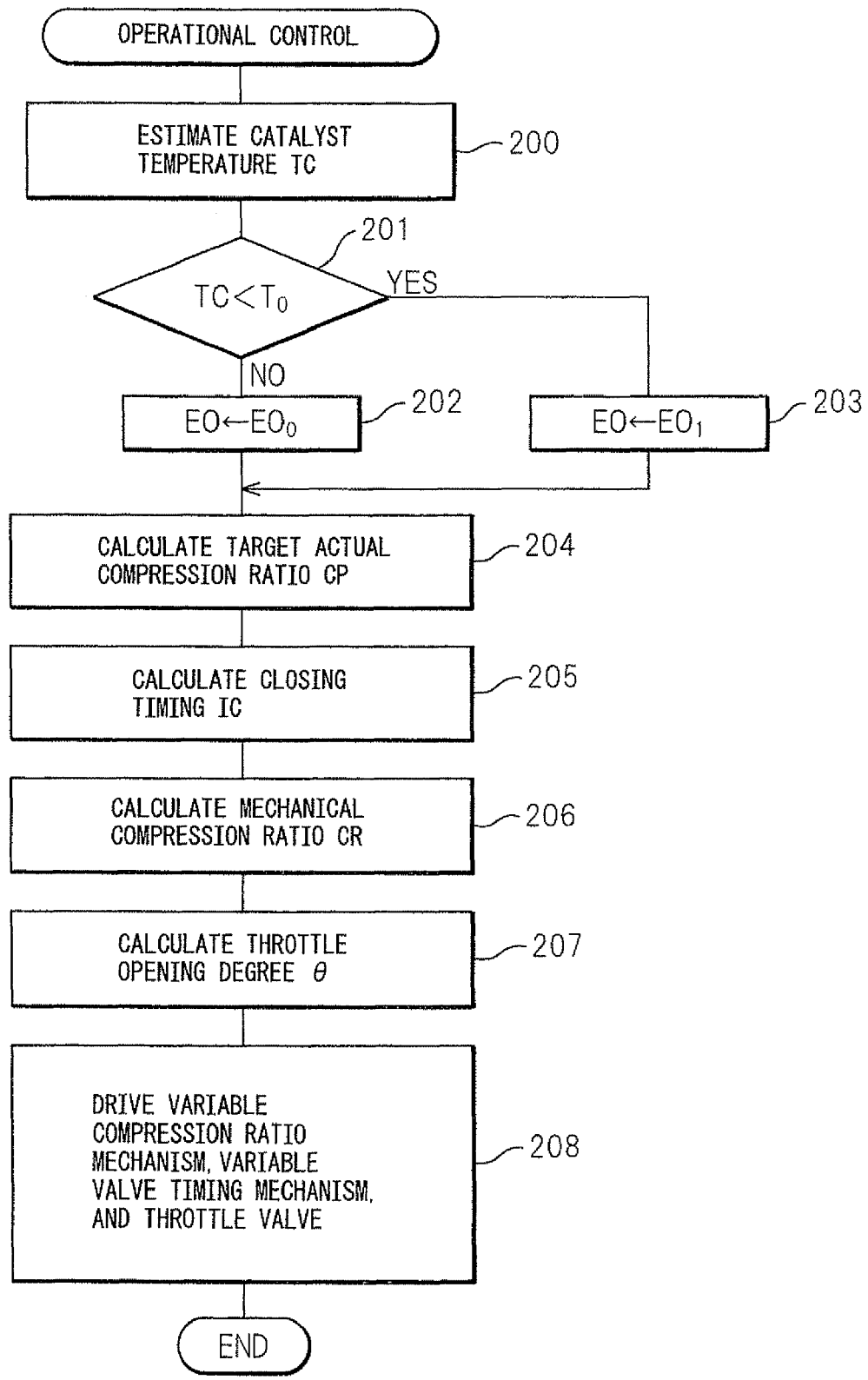
FIG. 17 is a flowchart for operational control.

FIG. 15 to FIG. 17 show a still further embodiment. In this embodiment, as shown in FIG. 15, a variable valve timing mechanism B' of a structure similar to the variable valve timing mechanism B provided at the intake valve 7 is also provided at the exhaust valve 9. Therefore, this variable valve timing mechanism B' can control the closing timing of the exhaust valve 9 and can individually control the opening timing of the exhaust valve 9.

In this embodiment, when it is predicted that the temperature of the three-way catalyst will fall to less than the activation temperature, without causing a reduction in the mechanical compression ratio, as shown in FIG. 16, the opening timing EO of the exhaust valve 9 is advanced from the usual $EO_0$ to $EO_1$ and thereby the actual expansion ratio is lowered.

FIG. 17 shows the operational control routine. Referring to FIG. 17, first, at step 200, the temperature TC of the three-way catalyst is estimated from the output signal of the temperature sensor 24. Next, at step 201, it is judged if the temperature TC of the three way catalyst becomes lower than the temperature $T_0$ at which it is predicted that the temperature TC of the three-way catalyst falls to less than the activation temperature. When $TC \geq T_0$, that is, when the three-way catalyst is sufficiently activated, the routine proceeds to step 202 where the opening timing EO of the exhaust valve 9 is made the usual opening timing $EO_0$ shown in FIG. 16. Next, the routine proceeds to step 204.

As opposed to this, when it is judged at step 201 that $TC<T_0$, that is, it is predicted that the temperature of the three-way catalyst will fall to less than the activation temperature, the routine proceeds to step 203 where the opening timing EO of the exhaust valve 9 is advanced to the $EO_1$ shown in FIG. 16. At this time, to further raise the exhaust gas temperature, the ignition timing may be retarded. Next, the routine proceeds to step 204.

From step 204 on, the operational control shown in FIG. 9 is performed. That is, at step 204, the target actual compression ratio CP is calculated. Next, at step 205, the closing timing IC of the intake valve 7 is calculated from the map shown in FIG. 13(A). Next, at step 206, the mechanical compression ratio CR is calculated. Next, at step 207, the opening degree θ of the throttle valve 19 is calculated from the map shown in FIG. 13(B). Next, at step 208, the variable compression ratio mechanism A is controlled so that mechanical compression ratio becomes the mechanical compression ratio CR, the variable valve timing mechanism B is controlled so that the closing timing of the intake valve 7 becomes the closing timing IC, the variable valve timing mechanism B" is controlled so that the opening timing EO of the exhaust valve 9 becomes the opening timing $EO_0$ or $EO_1$, and the throttle valve 19 is controlled so that the opening degree of the throttle valve 19 becomes the opening degree $\theta$.

Note that, as explained above, in the superhigh expansion ratio cycle shown in FIG. 8(B), the actual expansion ratio is made 26 or 23.5. The higher this actual expansion ratio the better, but as will be understood from FIG. 7, a considerably high theoretical thermal efficiency can be obtained if 20 or more with respect to the practically usable lower limit actual compression ratio $\epsilon=5$. Therefore, in the present invention, the variable compression ratio mechanism A is formed so that the actual expansion ratio becomes 20 or more.

LIST OF REFERENCE NUMERALS 1 crank case
2 cylinder block
3 cylinder head
4 piston
5 combustion chamber
7 intake valve
A variable Compression ratio mechanism
B variable valve timing mechanism

The invention claimed is:

1. A spark ignition type internal combustion engine provided with a variable compression ratio mechanism able to change a mechanical compression ratio, a variable valve timing mechanism able to control a closing timing of an intake valve, a throttle valve arranged in an engine intake passage, and a catalyst arranged in an engine exhaust passage, a processor; and
a memory, the memory storing instructions which when executed cause the processor to:
increase the mechanical compression ratio till a maximum mechanical compression ratio as an engine load becomes lower and shift the closing timing of the intake valve in a direction away from an intake bottom dead center as the engine load becomes lower when the catalyst is activated, wherein when it is predicted that a temperature of the catalyst will fall to less than an activation temperature, as compared with a case where the catalyst is activated, the mechanical compression ratio is decreased, the closing timing of the intake valve is shifted toward the intake bottom dead center and the opening degree of the throttle valve is decreased as the engine load becomes lower to lower an actual expansion ratio while maintaining the actual compression ratio the same or while increasing the actual compression ratio.

2. The spark ignition type internal combustion engine as claimed in claim 1, wherein when it is predicted that the temperature of the catalyst will fall to less than the activation temperature, the ignition timing is retarded.

3. The spark ignition type internal combustion engine as claimed in claim 1, wherein the expansion ratio at the time of the maximum mechanical compression ratio is 20 or more.

* * * * *